US00RE40727E

(19) United States
(12) Reissued Patent
Phillips

(10) Patent Number: US RE40,727 E
(45) Date of Reissued Patent: Jun. 9, 2009

(54) ALKALINE CELLS HAVING LOW TOXICITY RECHARGEABLE ZINC ELECTRODES

(75) Inventor: Jeffrey Phillips, La Jolla, CA (US)

(73) Assignee: PowerGenix Systems, Inc., Yukon (CA)

(21) Appl. No.: 11/598,153

(22) Filed: Nov. 9, 2006

Related U.S. Patent Documents

Reissue of:
(64) Patent No.: 6,818,350
Issued: Nov. 16, 2004
Appl. No.: 10/098,195
Filed: Mar. 15, 2002

U.S. Applications:
(60) Provisional application No. 60/276,372, filed on Mar. 15, 2001.

(51) Int. Cl.
*H01M 4/48* (2006.01)

(52) U.S. Cl. ..... 429/231; 429/229; 429/223; 429/232; 429/206; 429/207; 429/209

(58) Field of Classification Search ..... 429/231, 429/229, 223, 232, 206, 207, 209
See application file for complete search history.

(56) References Cited

U.S. PATENT DOCUMENTS

| | | | |
|---|---|---|---|
| 3,558,356 | A | 1/1971 | Jost |
| 4,017,665 | A | 4/1977 | Sandera et al. |
| 4,037,033 | A | 7/1977 | Takamura et al. |
| 4,084,047 | A | 4/1978 | Himy et al. |
| 4,224,391 | A | 9/1980 | Eisenberg |
| 4,273,841 | A | 6/1981 | Carlson |
| 4,304,828 | A | 12/1981 | Vaidyanathan |
| 4,358,517 | A | 11/1982 | Jones |
| 5,215,836 | A | 6/1993 | Eisenberg |
| 5,453,336 | A | 9/1995 | Adler et al. |
| 5,556,720 | A | 9/1996 | Charkey |
| 6,790,559 | B2 | 9/2004 | Phillips |
| 6,797,433 | B2 | 9/2004 | Phillips |
| 6,818,350 | B2 | 11/2004 | Phillips |
| 2003/0186127 | A1 | 10/2003 | Phillips |

*Primary Examiner*—Laura S Weiner
(74) *Attorney, Agent, or Firm*—Weaver Austin Villeneuve & Sampson LLP

(57) ABSTRACT

A nickel zinc alkaline cell has a zinc oxide negative electrode supported on a conductive substrate, an alkaline electrolyte, and a positive electrode having nickel hydroxide paste supported on a conductive substrate. The negative zinc oxide electrode comprises 85% to 95% zinc oxide powder, 1% to 10% bismuth oxide, 1% to 2% of a binder, and 0.05% to 5% by weight of a fluoride salt chosen from the group consisting of: sodium, potassium, rubidium, caesium, lithium, and mixtures thereof. Typically, the fluoride salt is potassium fluoride, in the amount of 0.5% by weight of the zinc oxide.

23 Claims, No Drawings

ALKALINE CELLS HAVING LOW TOXICITY RECHARGEABLE ZINC ELECTRODES

Matter enclosed in heavy brackets [ ] appears in the original patent but forms no part of this reissue specification; matter printed in italics indicates the additions made by reissue.

This application claims benefit of provisional application Ser. No. 60/276,372 filed Mar. 15, 2001.

FIELD OF THE INVENTION

This invention relates to alkaline cells, and particularly to alkaline galvanic cells having zinc electrodes and alkaline electrolyte, together with a nickel positive electrode. The invention provides low toxicity rechargeable zinc electrodes for such cells.

DESCRIPTION OF THE PRIOR ART

The performance of rechargeable zinc electrodes in alkaline electrolytes is the subject, for example, for JONES U.S. Pat. No. 4,358,517, issued Nov. 9, 1982. This patent teaches a nickel-zinc cell where the zinc electrode has a copper grid and an active material that comprises zinc-rich particles, calcium-rich particles, and an entanglement of cellulose fibres. Lead compounds may also be added to improve turn around efficiency and to reduce water loss.

The use of buffered electrolytes is also contemplated, for improvement of rechargeable zinc cells. ADLER et al U.S. Pat. No. 5,453,336, issued Sep. 26, 1995, teaches the use of an electrolyte that contains one or more hydroxides of an alkali metal, one or more fluorides of an alkali metal, and one or more carbonates of an alkali metal.

Another patent which teaches a ternary electrolyte for secondary electrochemical cells is CARLSON U.S. Pat. No. 4,273,841, issued Jun. 16, 1981, which teaches an aqueous alkaline solution having potassium hydroxide, potassium fluoride, and potassium phosphate.

EISENBERG U.S. Pat. No. 4,224,391 issued Sep. 23, 1980, and U.S. Pat. No. 5,215,836 issued Jun. 1, 1993, each describe electrolyte formulations that employ mixtures of potassium hydroxide and boric, phosphoric, or arsenic acids.

However, it should be noted that the latter patent describes advantages of alkali fluorides in the range of 0.01 moles to 1 mole; and thus, more alkaline solutions may be employed than are taught in the prior Eisenberg patent.

Other patents are specifically directed to the use of additives to the negative zinc electrodes of alkaline zinc batteries and cells. They include the following:

CHARKEY U.S. Pat. No. 5,556,720, issued Sep. 17 1996, teaches the use of a zinc negative electrode that has zinc active material, barium hydroxide, and strontium hydroxide, in a conductive matrix which includes a metallic oxide that is more electropositive than zinc. However, the zinc negative electrode is split into electrode assemblies which are separated by a hydrophobic element.

HIMY et al U.S. Pat. No. 4,084,047 teaches a zinc electrode that has a minor amount of one or more of a number of oxides including tantalum oxide, lead oxide, cadmium oxide, tin oxide, gallium oxide, and indium hydroxide. All of these are intended to reduce shape change, and to inhibit hydrogen gassing.

Another patent which teaches the use of zinc fluoride and zinc titanate is BADYANATHAN U.S. Pat. No. 4,304,828, issued Dec. 8, 1981.

Also, SANDERA et al U.S. Pat. No. 4,017,665, issued Apr. 12, 1977, teach that the direct additions of alkali fluoride to a zinc electrode has been found to be beneficial. This prevents the reversible movement of zinc into and out of solution in the electrolyte, thereby precluding undesired shifting of the active material on the collector electrode and thereby precluding shape change.

BACKGROUND OF THE INVENTION

As noted, pasted nickel hydroxide electrodes can have their performance improved by the addition of conductive diluents to improve active material utilization, and such as to establish a conductive insoluble CoOOH network in situ within a pasted nickel hydroxide electrode.

However, the problem of low positive electrode efficiency is exacerbated, sometimes significantly, when their use in nickel zinc batteries is considered, because of the electrolyte requirements of the zinc electrode.

Of course, it is well known that performance inhibiting disfigurement or rearrangement of zinc electrodes can occur during the cycling process of rechargeable zinc electrodes in alkaline electrolytes. Such disfigurement can be minimized in more dilute alkali hydroxide solutions.

The Jones Patent, noted above, appears to be somewhat effective in extending cycle life of the cell by the addition of calcium hydroxide to the zinc electrode.

It has also been noted that buffered electrolytes with or without fluoride additions may also result in increased zinc electrode lifespan. They are particularly described in the Adler et al patent, noted above, where a mixture of alkaline electrolyte having a strength of 2M to 12M is combined with a carbonate of 0.5M to 4M, and a fluoride of 0.5M to 4M.

The Carlson Patent, noted above, describes a mixture that employs 5% to 10% of hydroxide, 10% to 20% of phosphate, and 5% to 15% of fluoride.

SUMMARY OF THE INVENTION

Of course, a purpose of the present invention is to provide a formulation for a negative electrode that avoids issues of toxicity—thereby avoiding use of such elements as mercury. At the same time, because of the fact that nickel is one of the most expensive components of a nickel zinc cell, it is intended to provide the highest utilization of the nickel electrode as may be possible.

To that end, the present invention provides a nickel zinc alkaline cell having a zinc oxide electrode supported on a conductive substrate, an alkaline electrolyte, and a positive electrode having nickel hydroxide paste supported on a conductive substrate.

The negative zinc oxide electrode comprises 85% to 95% zinc oxide powder, 1% to 10% bismuth oxide, 1% to 2% of a binder, and 0.05% to 5% by weight of a fluoride salt.

The fluoride salt is a salt of a metal which is chosen from the group consisting of: sodium, potassium, rubidium, caesium, lithium, and mixtures thereof.

Typically, the fluoride salt is potassium fluoride, which may be present in the amount of 0.05% to 4.5% by weight of the zinc oxide. 0.5% has been found to be quite successful.

Also, typically, the bismuth oxide is present in the amount of 3% to 9% by weight of the zinc oxide.

Also, it has been found particularly to be effective when the alkaline electrolyte comprises a mixture of sodium hydroxide, potassium hydroxide, lithium hydroxide, and an acid chosen from the group consisting of: boric acid, phosphoric acid, and mixtures thereof.

When boric acid is present, it has a concentration of 0.6 to 1.3 moles per liter.

The stoichiometric excess of alkali hydroxide is between 2.5 moles and 5.0 moles.

Also, lithium hydroxide is present in the amount of about 0.05 to 3.0 moles.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

The benefits of the additional fluoride to the alkaline electrolyte of electrochemical cells that have a zinc negative electrode have been noted above. For example, the Eisenberg U.S. Pat. No. 5,215,836 describes a more alkaline range of effectiveness than the earlier U.S. Pat. No. 4,224,391, as a result of the addition of fluoride to the electrolyte. The greater alkalinity of the electrolyte promotes the performance of certain positive electrodes, and in particular it promotes the performance and the efficiency of a nickel electrode in nickel zinc cells.

Unfortunately, however, the addition of potassium fluoride to the electrolyte displaces lithium ions from the solution through the precipitation of lithium fluoride. That precipitation of lithium fluoride depletes the solution of lithium that is normally incorporated into the nickel electrode, and which provides beneficial effect to the nickel electrode especially during initial cycles of the cell. The effect, therefore, is a loss in nickel electrode efficiency, and a concomitant loss in cycling capability.

However, the inventor herein has unexpectedly discovered that the beneficial high solution alkalinity can be employed with the defined formulations of electrolyte and electrodes, and in particular the present inventor has unexpectedly discovered a surprising increase in nickel electrode efficiency as a result of practising the present invention.

To that end, the present inventor has provided a zinc electrode in a nickel zinc cell that contains bismuth oxide, a binder, and a small amount of alkali metal fluoride. This zinc electrode may be used in conjunction with a borate electrolyte which contains a mixture of alkali hydroxides; and when used in a nickel zinc cell having a nickel oxide counter electrode, unexpected cell efficiency values are derived.

The prior noted patent to Sandera et al teaches a benefit from adding alkaline metal fluorides to zinc electrodes, but high concentrations in the range of 5% to 55% by weight were required in order to observe any beneficial results.

Of course, Sandera et al had little consideration of the electrolyte interaction; neither did they consider the optimization of the positive electrode.

When the positive electrode is a nickel hydroxide electrode, the cost of that electrode must be kept in mind. Also, it must be noted that a high fluoride concentration may result in the premature passivation of the zinc electrode, particularly at high discharge rates, and this results in a sudden disproportionate loss in cell capacity as the discharge rate is increased.

Typical nickel zinc cells were constructed for purposes of experimentation with respect to the present invention, and the cells were constructed in keeping with the present invention having the addition of fluoride to the zinc oxide electrode.

Thus, a typical cell comprises a pasted nickel hydroxide positive electrode and a slurry coated zinc oxide negative electrode, with at least 100% coulombic excess of zinc oxide over the nickel hydroxide content.

Typically, the conducting substrate for the nickel hydroxide positive electrode is a nickel foam; and typically, the conductive substrate for the zinc oxide negative electrode is copper expanded metal.

Conductive enhancement additives were included in the positive electrode paste formulation, and comprised up to 2% to 3% by weight of each of nickel metal powder and cobalt metal powder.

However, it will be noted that the zinc electrode contained approximately 85% to 95% of zinc oxide powder, from 1% to 10% by weight of bismuth oxide—preferably, from 3% to 9%—1% to 2% of a binder as is well known to those skilled in the art, and from 0.05% up to 5% by weight of a fluoride salt of a metal chosen from the group of metals consisting of sodium, potassium, rubidium, caesium, lithium, and combinations thereof. Typically, 0.5% potassium fluoride was employed.

Four cell types were built, each having a capacity of approximately 2 Ampere Hours.

The type 1 cell was constructed in the manner described above, with the zinc oxide negative electrode having 0.5% by weight of potassium fluoride.

The type 2 cell was constructed as described above, but with no potassium fluoride additive to the negative electrode.

The type 3 cell was a standard cell, having no fluoride additive in the negative electrode, but having 0.1 mole fluoride buffering in the electrolyte.

The type 4 cell was constructed as the type 3 cell, except that it had 0.02 mole fluoride buffering in the electrolyte.

The electrolyte had a stoichiometric excess of alkaline hydroxide in the range of 2.5 moles to 5 moles. Also, the alkaline mixture contained between 0.05 moles and 3 moles of lithium hydroxide.

After assembly, all of the cells were filled with electrolyte under vacuum, and they were then allowed to stand for 2 hours before being charged to 150% of their rated capacity over a period of 48 hours.

Thereafter, the cells were discharged at 1 Ampere over a period of about 2 hours, and utilization of the positive electrode was measured. The results are shown in Table 1, below:

TABLE 1

| Cell Type | Zinc Electrode | Electrolyte | % Utilization of Nickel Electrode at 1 Amp. |
|---|---|---|---|
| 1 | 0.5% Fl | Fl Free | 91 |
| 2 | Standard | Fl Free | 76 |
| 3 | Standard | 0.1M Fl | 77 |
| 4 | Standard | 0.02M Fl | 75 |

It is seen that a standard cell, with no fluoride in the negative electrode and no fluoride in the electrolyte demonstrated a 76% utilization of the nickel electrode. However, the cell type 1, in keeping with the present invention, having 0.5% potassium fluoride additive to the zinc negative electrode, demonstrated 91% utilization of the nickel electrode at 1 Ampere.

The other cells, having fluoride doping in the electrolyte, showed no significant advantage over the standard cell.

Further tests were conducted with up to 1.5% of potassium fluoride in the negative electrode, and they also demonstrated utilization in the same order as set forth in Table 1, above. However, those cells demonstrated a low capacity at higher discharge rates; for example, when they were fully discharged in 1 hour or less.

There have been described alkaline cells having low toxicity rechargeable zinc electrodes, and it will be evident to those skilled in the art that variations and other embodiments of those cells can be constructed without departing from the spirit and scope of the appended claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A nickel zinc alkaline cell having a zinc oxide negative electrode supported on a conductive substrate, an alkaline electrolyte, and a positive electrode having nickel hydroxide paste supported on a conductive substrate;

wherein said negative zinc oxide electrode comprises 85% to 95% zinc oxide powder, 1% to 10% bismuth oxide, 1% to 2% of a binder, and 0.05% to 5% by weight of a fluoride salt; and wherein said fluoride salt is a salt of a metal chosen from the group consisting of: sodium, potassium, rubidium, caesium, lithium, and mixtures thereof.

2. The nickel zinc alkaline cell of claim 1, wherein said fluoride salt is potassium fluoride.

3. The nickel zinc alkaline cell of claim 1, wherein said fluoride salt is potassium fluoride in the amount of 0.05% to 4.5% by weight of said zinc oxide.

4. The nickel zinc alkaline cell of claim 1, wherein said fluoride salt is potassium fluoride in the amount of 0.5% by weight of said zinc oxide.

5. The nickel zinc alkaline cell of claim 3, wherein said bismuth oxide is present in the amount of 3% to 9% by weight of said zinc oxide.

6. The nickel zinc alkaline cell of claim 4, wherein said bismuth oxide is present in the amount of 3% to 9% by weight of said zinc oxide.

7. The nickel zinc alkaline cell of claim 1, wherein said positive electrode further comprises a conductivity enhancement additive chosen from the group consisting of: 2% to 3% by weight of nickel metal powder, 2% to 3% by weight of cobalt metal powder, and mixtures thereof.

8. The nickel zinc alkaline cell of claim 4, wherein said positive electrode further comprises a conductivity enhancement additive chosen from the group consisting of: 2% to 3% by weight of nickel metal powder, 2% to 3% by weight of cobalt metal powder, and mixtures thereof.

9. The nickel zinc alkaline cell of claim 1, wherein said alkaline electrolyte comprises a mixture of sodium hydroxide, potassium hydroxide, lithium hydroxide, and an acid chose from the group consisting of: boric acid, phosphoric acid, and mixtures thereof:

wherein when boric acid is present, it has a concentration of 0.6 to 1.3 moles per liter;

wherein the stoichiometric excess of alkali hydroxide is between 2.5 moles and 5.0 moles; and wherein the electrolyte contains 0.05 to 3.0 moles of lithium hydroxide.

10. The nickel zinc alkaline cell of claim 4, wherein said alkaline electrolyte comprises a mixture of sodium hydroxide, potassium hydroxide, lithium hydroxide, and an acid chose from the group consisting of: boric acid, phosphoric acid, and mixtures thereof, wherein when boric acid is present, it has a concentration of 0.6 to 1.3 moles per liter;

wherein the stoichiometric excess of alkali hydroxide is between 2.5 moles and 5.0 moles; and wherein the electrolyte contains 0.05 to 3.0 moles of lithium hydroxide.

*11. A nickel zinc alkaline cell having a zinc oxide negative electrode supported on a conductive substrate, alkaline electrolyte, and a positive electrode supported on a conductive substrate; wherein said negative electrode as-constructed comprises zinc oxide, a binder, and 0.043% to 3.8% by weight of a fluoride salt; and wherein said fluoride salt is a salt of a metal chosen from the group consisting of: sodium, potassium, rubidium, caesium, lithium, and mixtures thereof.*

*12. The nickel zinc alkaline cell of claim 11, wherein said fluoride salt is potassium fluoride.*

*13. The nickel zinc alkaline cell of claim 11, wherein said fluoride salt is potassium fluoride in the amount of 0.05% to 4.5% by weight of said zinc oxide.*

*14. The nickel zinc alkaline cell of claim 13, wherein said negative electrode further comprises bismuth oxide in the amount of 1% to 10% by weight.*

*15. The nickel zinc alkaline cell of claim 11, wherein said positive electrode further comprises a conductivity enhancement additive selected from the group consisting of 2% to 3% by weight of nickel metal powder, 2% to 3% by weight of cobalt metal powder, and mixtures thereof.*

*16. The nickel zinc alkaline cell of claim 11, wherein the alkaline electrolyte comprises hydroxide in stoichiometric excess over an acid selected from the group consisting of boric acid, phosphoric acid, and mixtures thereof.*

*17. The nickel zinc alkaline cell of claim 16, wherein the alkaline electrolyte comprises hydroxide in stoichiometric excess over phosphoric acid.*

*18. The nickel zinc alkaline cell of claim 11, wherein said fluoride is 0.05% to 1.5% by weight of the negative electrode.*

*19. The nickel zinc alkaline cell of claim 11, wherein said fluoride is about 0.5% by weight of the negative electrode.*

*20. A negative electrode supported on a conductive substrate comprising zinc oxide, bismuth oxide, a binder, and 0.043% to 3.8% by weight of a fluoride salt; and wherein said fluoride salt is a salt of a metal chosen from the group consisting of: sodium, potassium, rubidium, caesium, lithium, and mixtures thereof.*

*21. The negative electrode of claim 20, wherein said fluoride salt is potassium fluoride.*

*22. The negative electrode of claim 20, wherein said fluoride salt is potassium fluoride in the amount of 0.05% to 4.5% by weight of said zinc oxide.*

*23. The negative electrode of claim 20, wherein said bismuth oxide is present in the amount of 1% to 10% by weight.*

* * * * *

UNITED STATES PATENT AND TRADEMARK OFFICE

CERTIFICATE OF CORRECTION

PATENT NO. : RE 40,727 E
APPLICATION NO. : 11/598153
DATED : June 9, 2009
INVENTOR(S) : Jeffery Phillips It is certified that error appears in the above-identified patent and that said Letters Patent is hereby corrected as shown below:

ON THE TITLE PAGE:

In Item (73) Assignee Section, change "PowerGenix Systems, Inc., Yukon, CA" to --PowerGenix Systems, Inc., San Diego, CA--.

Signed and Sealed this

Eighth Day of September, 2009

David J. Kappos

David J. Kappos
*Director of the United States Patent and Trademark Office*